United States Patent
Hashimoto et al.

(10) Patent No.: US 7,247,358 B2
(45) Date of Patent: Jul. 24, 2007

(54) LAMINATE CONTROLLING CURL OF HARDCOAT LAYER

(75) Inventors: Hiroyuki Hashimoto, Tokyo-To (JP); Shoichi Komatsu, Yokohama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/946,569

(22) Filed: Sep. 21, 2004

(65) Prior Publication Data
US 2005/0136273 A1    Jun. 23, 2005

(30) Foreign Application Priority Data
Sep. 30, 2003   (JP) ............... 2003-341236

(51) Int. Cl.
*B32B 27/30* (2006.01)
(52) U.S. Cl. .................. 428/1.54; 428/1.1; 428/1.6
(58) Field of Classification Search ............. 428/1.1, 428/1.33, 1.54, 1.6, FOR. 135, 336; 349/137, 349/601; 359/601
See application file for complete search history.

(56) References Cited

U.S. PATENT DOCUMENTS

| 5,663,211 | A | 9/1997 | Kominami et al. ............. 522/8 |
| 5,942,329 | A | 8/1999 | Nakayama et al. ......... 428/423.1 |
| 5,955,190 | A | 9/1999 | Majumdar et al. .......... 428/327 |
| 6,103,370 | A | 8/2000 | Onozawa et al. ........... 428/354 |
| 6,231,984 | B1 | 5/2001 | Horibe et al. .............. 428/416 |
| 6,572,973 | B1 | 6/2003 | Taruishi et al. ............. 428/447 |
| 6,676,997 | B2 | 1/2004 | Tanimoto et al. ......... 427/407.1 |

*Primary Examiner*—Rena Dye
*Assistant Examiner*—Sow-Fun Hon
(74) *Attorney, Agent, or Firm*—Harness, Dickey & Pierce, P.L.C.

(57) ABSTRACT

Disclosed is a laminate with a reduced tendency for curling in a hard coat layer. The laminate comprises a transparent substrate and a hard coat layer provided on the transparent substrate. The hard coat layer is formed of a cured product of a composition comprising a mixture of pentaerythritol acrylate with an isocyanurate ethoxy-modified diacrylate.

6 Claims, 1 Drawing Sheet

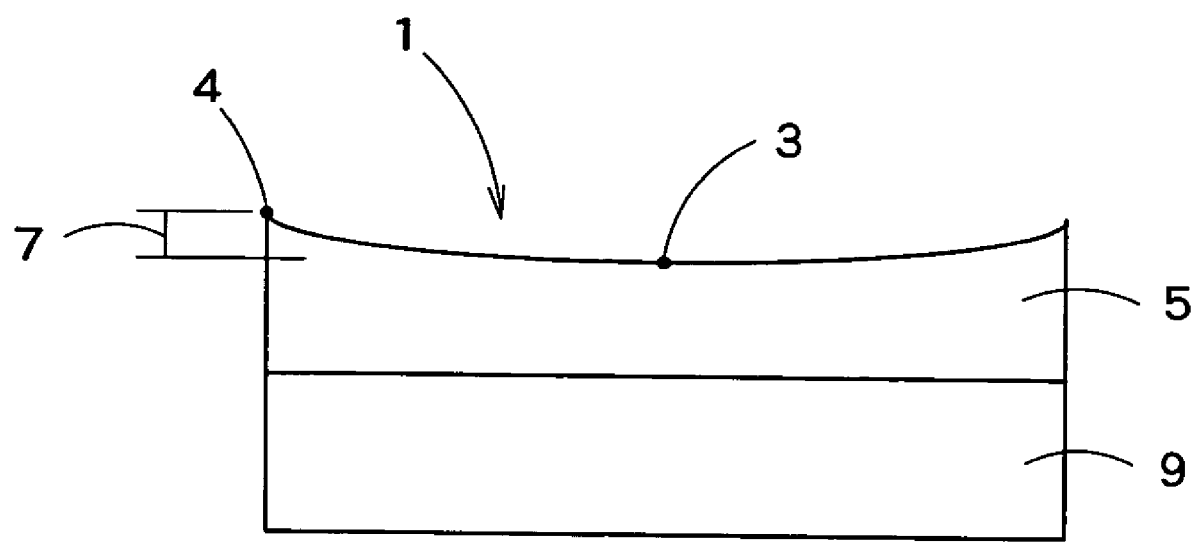
F I G. 1

LAMINATE CONTROLLING CURL OF HARDCOAT LAYER

BACKGROUND OF THE INVENTION

1. Field of the Invention

The present invention relates to a laminate, particularly a (optical) laminate for use in displays such as CRTs and liquid crystal panels.

2. Background Art

Most of laminates, especially displays such as liquid crystal panels, have a construction including a luminous body, a reflector plate, a polarizing plate, an anti-dazzling film, a hard coat layer, and a transparent substrate. The hard coat layer is provided mainly for protecting an anti-dazzling film and is generally formed by curing a heat curable resin. In order to improve the mechanical strength of the hard coat layer, Japanese Patent Laid-Open Nos. 80472/1996 and 70606/1999 propose exposure of an ionizing radiation curing resin or the like to an ionizing radiation for crosslinking curing to form a hard coat layer.

On the other hand, in recent years, there is an ever-increasing demand for a reduction in thickness in displays used in cellular (portable) phones, small notebook computers and the like. In order to meet this demand, the present inventors have made an experiment in which a transparent substrate having a thickness which is half of the conventional thickness (100 to 70 µm) is coated with an ionizing radiation curing resin or the like to form a coating which is then exposed to an ionizing radiation for crosslinking curing to form a hard coat layer. As a result, it was found that curling occurred in the hard coat layer, making it difficult to form a polarizing plate or an anti-dazzling film.

Accordingly, at the present time, the development of a laminate with a reduced tendency for curling in a hard coat layer is strongly desired.

SUMMARY OF THE INVENTION

The present inventors have now found that the utilization of a combination of two specific acrylate compounds can suppress the occurrence of curling and can realize the formation of a hard coat layer having a smooth layer surface. The present invention has been made based on such finding.

Accordingly, an object of the present invention is to provide a laminate which has a reduced tendency for curling in a hard coat layer and has a highly smooth surface.

Thus, according to the present invention, there is provided a laminate with a reduced tendency for curling in a hard coat layer, said laminate comprising a transparent substrate and a hard coat layer provided on said transparent substrate, said hard coat layer being formed of a cured product of a composition comprising a mixture of pentaerythritol acrylate with an isocyanurate ethoxy-modified diacrylate represented by formula (I):

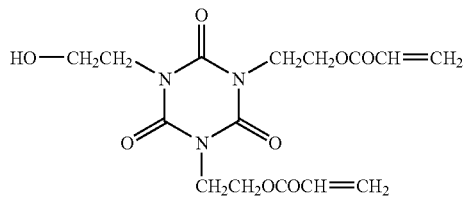

BRIEF DESCRIPTION OF THE DRAWING

FIG. 1 is a schematic diagram showing one embodiment of the laminate according to the present invention.

DESCRIPTION OF REFERENCE CHARACTERS IN THE DRAWING

1: laminate; 3: center point of hard coat layer; 4: peripheral part of hard coat layer; 5: hard coat layer; 7: curl width; and 9: transparent substrate.

DETAILED DESCRIPTION OF THE INVENTION

Laminate

The laminate according to the present invention will be described with reference to FIG. 1. FIG. 1 is a cross-sectional view of a laminate 1 according to the present invention. A hard coat layer is provided on the upper surface of a transparent substrate 9. The hard coat layer 5 is formed by coating a composition comprising pentaerythritol acrylate and an isocyanurate ethoxy-modified diacrylate onto the upper surface of the transparent substrate 9 and exposing the coating to ultraviolet light.

The laminate according to the present invention does not cause curling of the hard coat layer. Therefore, according to the present invention, the difference in thickness 7 between the peripheral part 4 and the center part 3 in the hard coat layer is most preferably 0 µm. However, from the viewpoint of technique, the difference in thickness 7 between the peripheral part 4 and the center part 3 in the hard coat layer is not more than 1.0 µm, preferably not more than 0.5 µm, more preferably 0.3 µm.

1) Hard Coat Layer

The hard coat layer in the present invention is formed by curing a composition comprising a mixture of pentaerythritol acrylate [$(CH_2=CHCOCOH_2)_3CCH_2OH$] with an isocyanurate ethoxy-modified diacrylate represented by formula (I).

The mixing ratio between the pentaerythritol acrylate and the isocyanurate ethoxy-modified diacrylate is 4:6 to 6:4, more preferably 4.5:5.5 to 5.5:4.5.

In the present invention, the hard coat layer is preferably formed of the above two acrylate compounds. Further, other basic materials, for example, ionizing radiation curing compositions such as UV curable compounds, may be added. In forming the hard coat layer, a photopolymerization initiator can be used, and specific examples thereof include 1-hydroxy-cyclohexyl-phenyl-ketone. This compound is commercially available, for example, from Ciba Specialty Chemicals, K.K. under the tradename Irgacure 184.

Optional Materials

In the laminate according to the present invention, the hard coat layer may contain an antistatic agent (an electrically conductive agent) and/or an anti-dazzling agent.

Antistatic Agent

Specific examples of antistatic agents include electrically conductive fine particles of a metal or a metal oxide or an organic compound, for example, fine particles of antimony-doped indium tin oxide (hereinafter referred to as "ATO"), indium tin oxide (hereinafter referred to as "ITO"), and organic compounds which had been surface treated with gold and/or nickel.

The amount of the antistatic agent added is not less than 5% by weight and not more than 70% by weight based on the total weight of the hard coat layer. Preferably, the lower limit of the addition amount is 15% by weight, and the upper limit of the addition amount is 60% by weight. More preferably, the lower limit of the addition amount is 25% by weight, and the upper limit of the addition amount is 50% by weight.

Anti-Dazzling Agent

Specific examples of anti-dazzling agents include plastic beads, particularly preferably transparent plastic beads. Specific examples of plastic beads include styrene beads (refractive index 1.59), melamine beads (refractive index 1.57), acryl beads (refractive index 1.49), acryl-styrene beads (refractive index 1.54), polycarbonate beads, and polyethylene beads. Preferred plastic beads include styrene beads.

The particle diameter of the plastic beads is not less than 0.5 μm and not more than 15 μm. Preferably, the lower limit of the particle diameter is 3 μm, and the upper limit of the particle diameter is 6 μm. Particle diameters falling within the above-defined range are advantageous in that the light diffusing effect is high, satisfactory anti-dazzling properties can be imparted, the internal haze value can be increased, and dazzling of images can be satisfactorily improved.

The amount of the plastic beads added is not less than 3% by weight and not more than 30% by weight based on the total weight of the hard coat layer. Preferably, the lower limit of the addition amount is 5% by weight, and the upper limit of the addition amount is 20% by weight. More preferably, the lower limit of the addition amount is 8% by weight, and the upper limit of the addition amount is 15% by weight. The addition amount falling within the above-defined range is advantageous in that the effect of diffusing light is high, the sharpness of the transmitted image is increased, and dazzling of images can be suppressed.

When plastic beads are added, inorganic fillers such as silica may be added. The addition of the inorganic filler can suppress the settling of plastic beads added to the resin component for forming the hard coat layer.

The particle diameter of the inorganic filler is preferably not less than 0.5 μm and not more than 5 μm. The amount of the inorganic filler added is not less than 3% by weight and not more than 30% by weight based on the total weight of the hard coat layer. Preferably, the upper limit of the addition amount is 15% by weight. When the particle diameter or addition amount of the inorganic filler falls within the above-defined range, settling of the plastic beads can be effectively prevented and, at the same time, the transparency of the hard coat layer can be ensured.

When the plastic beads or inorganic fillers have been added, a preferred method is to satisfactorily mix them with the resin component for constituting the hard coat layer to prepare a homogeneous dispersion which is then coated onto the transparent substrate.

Antistatic Agent and Anti-Dazzling Agent

In another embodiment of the present invention, both the antistatic agent and the anti-dazzling agent may be added. The details of the antistatic agent and the anti-dazzling agent may be the same as those as described above.

Formation of Hard Coat Layer

The hard coat layer may be formed by mixing the above two acrylate compounds and optionally an antistatic agent and an anti-dazzling agent in a suitable solvent, for example, toluene, xylene, cyclohexane, ethyl acetate, butyl acetate, propyl acetate, MEK, and MIBK, to prepare a liquid composition which is then coated onto a transparent substrate.

In a preferred embodiment of the present invention, a leveling agent, for example, a fluorine or silicone leveling agent, is added to the liquid composition. In the liquid composition with the leveling agent added thereto, upon coating or drying of the coating, the inhibition of curing by oxygen on the surface of the coating can be effectively prevented, and, at the same time, the anti-scratch effect can be imparted. The leveling agent is preferably utilized in transparent substrates in a film form where heat resistance is required (for example, triacetylcellulose).

Methods usable for coating the liquid composition include roll coating, Mayer-bar coating, and gravure coating. After coating of the liquid composition, drying and ultraviolet curing are carried out.

Specific examples of ultraviolet light sources include light sources such as ultrahigh pressure mercury lamps, high pressure mercury lamps, low pressure mercury lamps, carbon arc lamps, blacklight fluorescent lamps, and metal halide lamps. The wavelength of the ultraviolet light may be in a wavelength range of 190 to 380 nm. Specific examples of electron beam sources include various electron beam accelerators, for example, Cockcroft-Walton, van de Graaff, resonance transformer, insulated core transformer, linear, dynamitron, and high-frequency electron beam accelerators.

2) Transparent Substrate

Preferably, the transparent substrate is transparent, smooth, and resistant to heat and has excellent mechanical strength. Specific examples of the material for constituting the transparent substrate include thermoplastic resins such as polyester, cellulose triacetate, cellulose diacetate, cellulose acetate butyrate, polyester, polyamide, polyimide, polyether sulfone, polysulfone, polypropylene, polymethyl pentene, polyvinyl chloride, polyvinyl acetal, polyether ketone, polymethyl methacrylate, polycarbonate, and polyurethane. Preferred are polyesters, and cellulose triacetate.

In the present invention, these thermoplastic resins are used as a thin, highly flexible film. Depending upon embodiments where curing properties are required, plates of thermoplastic resins or glass plates may also be used.

The thickness of the transparent substrate is not less than 20 μm and not more than 300 μm. Preferably, the upper limit of the thickness is 200 μm, and the lower limit of the thickness is 30 μm. When the transparent substrate is in a plate form, the thickness may exceed the above upper limit.

In the formation of the hard coat layer on the transparent substrate, the transparent substrate may previously be subjected to physical treatment such as corona discharge treatment and oxidation treatment, or may previously be coated with a coating composition called an anchoring agent or a primer from the viewpoint of improving the adhesion.

3) Optional Layer

In another aspect of the present invention, there is provided a laminate having a basic construction comprising a transparent substrate and a hard coat layer provided on the upper surface of the transparent substrate, wherein at least one layer selected from the group consisting of an antistatic layer, an anti-dazzling layer, and a refractive index layer is provided.

a. Antistatic layer

The antistatic layer (electrically conductive layer) is preferably formed on the upper surface of the hard coat layer. Specific examples of methods usable for forming an antistatic layer are one in which a vapor-deposited film is formed by vapor-depositing or sputtering an electrically conductive metal, an electrically conductive metal oxide or the like onto the upper surface of a hard coat layer, and one in which a coating is formed by a resin composition comprising electrically conductive fine particles dispersed in a resin.

When the antistatic layer is formed as a vapor-deposited film, examples of electrically conductive metals or electrically conductive metal oxides include antimony-doped indium tin oxide (hereinafter referred to as "ATO") and indium tin oxide (hereinafter referred to as "ITO").

The thickness of the vapor-deposited film as the antistatic layer is not less than 10 nm and not more than 200 nm. Preferably, the upper limit of the thickness is 100 nm, and the lower limit of the thickness is 50 nm.

Specific examples of electrically conductive fine particles usable in forming the antistatic layer as a coating may be the same as those described above in connection with the antistatic agent. The amount of the electrically conductive fine particles added is not less than 5% by weight and not more than 70% by weight based on the total weight of the antistatic layer. Preferably, the upper limit of the addition amount is 60% by weight, and the lower limit of the addition amount is 15% by weight.

The resin for dispersing electrically conductive fine particles is preferably transparent, and three types of resins, that is, ionizing radiation curing resins which are curable by ultraviolet light or electron beam irradiation, mixtures of ionizing radiation curing resins with solvent drying type resins, and heat-curing resins, may be mentioned as specific examples of this resin.

Ionizing Radiation Curing Resin

Specific examples of ionizing radiation curing resins include resins having an acrylate functional group, and examples thereof include relatively low-molecular weight polyester resins, polyether resins, acrylic resins, epoxy resins, urethane resins, alkyd resins, spiroacetal resins, polybutadiene resins, and polythiol-polyene resins, oligomers or prepolymers of (meth)acrylate or the like of polyfunctional compounds, such as polyhydric alcohols, and ionizing radiation curing resins containing a reactive diluent. Reactive diluents usable herein include monofunctional monomers, such as ethyl(meth)acrylate, ethylhexyl (meth)acrylate, styrene, methyl styrene, and N-vinylpyrrolidone, and polyfunctional monomers, for example, polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

When the ionizing radiation curing resin is used as the ultraviolet curing resin, the use of a photopolymerization initiator is preferred. Specific examples of photopolymerization initiators include acetophenones, benzophenones, Michler's benzoyl benzoate, α-amyloxime esters, tetramethylthiuram monosulfide, and thioxanthones. Further, the use of a mixture of the photopolymerization initiator with a photosensitizer is preferred. Specific examples thereof include n-butylamine, triethylamine, and poly-n-butylphosphine.

Solvent Dryina Type Resin

Main solvent drying type resins usable as a mixture with the ionizing radiation curing resin are thermoplastic resins which are commonly described and used in the art. The addition of the solvent drying type resin can effectively prevent defects of coating of the coated face.

In a preferred embodiment of the present invention, when the material for the transparent substrate is a cellulosic resin such as TAC, specific examples of preferred thermoplastic resins include cellulosic resins, for example, nitrocellulose, acetylcellulose, cellulose acetate propionate, and ethylhydroxyethylcellulose. The use of the cellulosic resin can improve the adhesion between the transparent substrate and the antistatic layer and the transparency.

Heat Curable Resins

Specific examples of heat curable resins include phenolic resins, urea resins, diallyl phthalate resins, melamine resins, guanamine resins, unsaturated polyester resins, polyurethane resins, epoxy resins, aminoalkyd resins, melamine-urea co-condensed resins, silicone resins, and polysiloxane resins. When heat curable resins are used, if necessary, crosslinking agents, curing agents such as polymerization initiators, polymerization accelerators, solvents, viscosity modifiers and the like may be further added.

The thickness of the coating as the antistatic layer is not less than 0.05 μm and not more than 2 μm. Preferably, the upper limit of the thickness is 1 μm, and the lower limit of the thickness is 0.1 μm.

When the coating is formed as the antistatic layer, a liquid composition containing a mixture of the above resin with the above electrically conductive fine particles can be coated by a coating method such as roll coating, Mayer-bar coating, or gravure coating. After coating of the liquid composition, drying and ultraviolet curing are carried out.

The ionizing radiation curing resin composition is cured by irradiation with an electron beam or ultraviolet light. In the case of electron bean curing, for example, electron beams having an energy of 100 to 300 KeV are used. On the other hand, in the case of ultraviolet curing, for example, ultraviolet light emitted from light sources such as ultrahigh pressure mercury lamps, high pressure mercury lamps, low pressure mercury lamps, carbon arc, xenon arc, and metal halide lamps, are utilized.

Preferably, the antistatic layer is formed so as to have a surface resistivity of not more than $5 \times 10^7$ Ω/□.

b. Anti-Dazzling Layer

The anti-dazzling layer is preferably formed on the upper surface of the hard coat layer or the antistatic layer. The anti-dazzling layer may be formed by coating a liquid composition comprising an anti-dazzling agent dispersed in the resin. The anti-dazzling agent, the resin, the coating method and the like may be the same as those described above.

The thickness of the anti-dazzling layer is not less than 0.5 μm and not more than 10 μm. Preferably, the lower limit of the thickness is 1 μm, and the upper limit of the thickness is 7 μm.

In a preferred embodiment of the present invention, an antistatic layer/anti-dazzling layer formed of a mixture of an antistatic agent with an anti-dazzling agent may be provided.

c. Refractive Index Layer

The refractive index layer is preferably formed on the upper surface of the anti-dazzling layer. Preferably, the refractive index layer has a lower refractive index than the anti-dazzling layer. In a preferred embodiment of the present invention, the anti-dazzling layer has a refractive index of not less than 1.5, and the refractive index of the refractive index layer is less than 1.5, preferably not more than 1.45.

A preferred embodiment of the laminate according to the present invention comprises a transparent substrate and a transparent electrically conductive layer (the refractive index thereof being not more than that of the anti-dazzling layer), an anti-dazzling layer (refractive index: not less than 1.50), and a refractive index layer (refractive index: less than 1.5). Since the laminate is in contact with an air layer (refractive index: 1.0), the reflection can be efficiently prevented. In particular, the effect of preventing reflection attained by stacking the refractive index layer having a lower refractive index than the refractive index of the anti-dazzling layer can be enhanced.

The thickness of the refractive index layer is not less than 20 nm and not more than 800 nm. Preferably, the upper limit of the thickness is 400 nm, and the lower limit of the thickness is 50 nm.

Specific examples of the material for constituting the refractive index layer include silicone-containing vinylidene fluoride copolymers. An example thereof is a resin composition comprising: 100 parts by weight of a fluorine-containing copolymer having a fluorine content of 60 to 70% by weight prepared by copolymerizing a monomer composition containing 30 to 90% by weight of vinylidene fluoride and 5 to 50% by weight of hexafluoropropylene; and 80 to 150 parts by weight of a polymerizable compound containing an ethylenically unsaturated group.

An example of the fluorine-containing copolymer is a copolymer prepared by copolymerizing a monomer composition containing vinylidene fluoride and hexafluoropropylene. The content of vinylidene fluoride and the content of hexafluoropropylene in this monomer composition are 30 to 90% by weight, preferably 40 to 80% by weight, particularly preferably 40 to 70% by weight, and 5 to 50% by weight, preferably 10 to 50% by weight, particularly preferably 15 to 45% by weight, respectively. This monomer composition may further contain 0 to 40% by weight, preferably 0 to 35% by weight, particularly preferably 10 to 30% by weight of tetrafluoroethylene.

The monomer composition for preparing the fluorine-containing copolymer may if necessary contain, for example, not more than 20% by weight, preferably not more than 10% by weight, of other comonomer component. Specific examples of other comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoroethylene, 3,3,3-trifluoropropylene, 1,1,2-trichloro-3,3,3-trifluoropropylene, and α-trifluoromethacrylic acid.

The content of the fluorine in the fluorine-containing copolymer obtained from the above monomer composition is preferably 60 to 70% by weight, more preferably 62 to 70% by weight, particularly preferably 64 to 68% by weight. When the fluorine content is in the above-defined range, the solubility of the fluorine-containing copolymer in solvents which will be described later is high. Further, when the fluorine-containing copolymer is contained as a component, a thin film having excellent adhesion, high transparency, low refractive index, and excellent mechanical strength can be formed.

The molecular weight of the fluorine-containing copolymer is preferably 5000 to 200000, particularly preferably 10000 to 100000, in terms of number average molecular weight as determined using polystyrene as a standard. When the fluorine-containing copolymer having the above molecular weight is used, the resultant fluororesin composition becomes a suitable viscosity value and thus surely has suitable coatability.

The refractive index of the fluorine-containing copolymer per se is not more than 1.45, preferably not more than 1.42, more preferably not more than 1.40. When the refractive index is in the above-defined range, the formed thin film has favorable antireflection effect.

Further, a coating may be formed by exposing the fluorine-containing copolymer and the resin to an actinic radiation optionally in the presence of a photopolymerization initiator to perform polymerization, or by heating the fluorine-containing copolymer and the resin in the presence of a thermal polymerization initiator to perform polymerization. In this case, the same resins as that described above in connection with the antistatic layer may be used. Among these resins, dipentaerythritol hexa(meth)acrylate, pentaerythritol tetra(meth)acrylate, dipentaerythritol penta(meth)acrylate, and caprolactone-modified dipentaerythritol hexa(meth)acrylate are preferred.

When the resin used contains three or more ethylenically unsaturated groups per molecule, in particular, the resultant fluororesin composition can form a thin film that are very good in mechanical properties such as adhesion to the substrate and scratch resistance of the surface of the substrate.

The amount of the resin added is 30 to 150 parts by weight, preferably 35 to 100 parts by weight, particularly preferably 40 to 70 parts by weight, based on 100 parts by weight of the fluorine-containing copolymer. Further, the content of the fluorine based on the total content of polymer forming components including the fluorine-containing copolymer and the resin is 30 to 55% by weight, preferably 35 to 50% by weight.

When the addition amount or the fluorine content is in the above-defined range, the refractive index layer has good adhesion to the substrate and can exhibit good antireflection effect by virtue of high refractive index.

In forming the refractive index layer, if necessary, a suitable solvent may be used to modify the viscosity to a value which provides favorable coatability as a resin composition, that is, a value in the range of 0.5 to 5 cps (25° C.), preferably 0.7 to 3 cps (25° C.). In this case, an antireflection film having an excellent capability of reflecting visible light can be realized, and a thin film which is even, that is, free from uneven coating, can be formed. Further, a refractive index layer which is particularly excellent in adhesion to the substrate can be formed.

Means for curing the resin may be the same as that described above in connection with the antistatic layer. When heating means is used as the curing means, preferably, a thermal polymerization initiator which, upon heating, generates, e.g., radicals to initiate polymerization of the polymerizable compound is added to the fluororesin composition.

The refractive index layer may also be formed by other conventional thin film forming means, for example, vacuum deposition, sputtering, reactive sputtering, ion plating, electroplating or other suitable means. For example, a coating of an antireflection coating material other than the above material, an about 0.1 μm-thick very thin film or metal deposited film of MgF$_2$ or the like, or a deposited film of SiOx or MgF$_2$ may be formed as the refractive index layer.

Applications of Laminate

The laminate according to the present invention is usable in transmission displays. In particular, the laminate according to the present invention can be used in displays such as televisions, computers, word processors and the like, especially on the surface of displays for high definition images, such as CRT and liquid crystal panels.

EXAMPLES

The following Example further illustrates the contents of the present invention. The present invention, however, is not to be construed as being limited thereto.

Preparation of Laminate

TAC (tradename: KC4U×2 MW, manufactured by Konica Corp.) (film thickness: 40 mm) was provided as a substrate. The following coating liquid for a transparent hard coat layer was bar coated. The coating was then dried to remove the solvent, and the dried coating was cured using an H bulb in a UV irradiation apparatus (manufactured by Fusion UV Systems Japan KK) as a light source (integrated quantity of light: 99 mj) to prepare a laminate comprising a transparent substrate having on its surface an about 7 mm-thick hard coat layer.

| Preparation of coating liquid for transparent hard coat layer | |
|---|---|
| Example 1 | |
| Pentaerythritol triacrylate (PET-30, manufactured by Nippon Kayaku Co., Ltd.) | 20 pts. wt. |
| Isocyanuric acid EO-modified diacrylate (compound of formula (I): M-215, manufactured by Toa Gosei Chemical Industry Co., Ltd.) | 20 pts. wt. |
| Toluene | 60 pts. wt. |
| Siloxane leveling agent (10-301, manufactured by Dainichiseika Color & Chemicals Manufacturing Co., Ltd.) | 0.2 pt. wt. |
| 1-Hydroxy-cyclohexyl-phenyl-ketone (Irgacure 184, manufactured by Ciba-Geigy Ltd.) | 2 pts. wt. |
| Comparative Example 1 | |
| Pentaerythritol triacrylate (PET-30, manufactured by Nippon Kayaku Co., Ltd.) | 40 pts. wt. |
| Toluene | 60 pts. wt. |
| Siloxane leveling agent (10-301, manufactured by Dainichiseika Color & Chemicals Manufacturing Co., Ltd.) | 0.2 pt. wt. |
| 1-Hydroxy-cyclohexyl-phenyl-ketone (Irgacure 184, manufactured by Ciba-Geigy Ltd.) | 2 pts. wt. |
| Comparative Example 2 | |
| Pentaerythritol triacrylate (PET-30, manufactured by Nippon Kayaku Co., Ltd.) | 20 pts. wt. |
| Polyethylene diacrylate (M-240, manufactured by Toa Gosei Chemical Industry Co., Ltd.) | 20 pts. wt. |
| Toluene | 60 pts. wt. |
| Siloxane leveling agent (10-301, manufactured by Dainichiseika Color & Chemicals Manufacturing Co., Ltd.) | 0.2 pt. wt. |
| 1-Hydroxy-cyclohexyl-phenyl-ketone (Irgacure 184, manufactured by Ciba-Geigy Ltd.) | 2 pts. wt. |

Evaluation Test

The laminates of Example 1 and Comparative Examples 1 and 2 prepared above were subjected to the following evaluation tests. The results were as shown in Table 1 below.

Evaluation 1: Test on Occurrence of Curling

The laminate was cut into a size of 10 cm×10 cm, and the maximum curling width (along FIG. 1) was measured. In this case, the laminate was placed in an environment of temperature 25° C. and humidity 55% for the measurement.

Evaluation 2: Test on Degree of Adhesion of Coating

The laminate only on its hard coat layer face was cut with a cutter knife to form 100 cross-cuts (10 cross-cuts in longitudinal direction×10 cross-cuts in transverse direction=100 cross-cuts). Next, for specimens having a size of 2.5 cm×2.5 cm, cross-cut Cello-Tape (manufactured by Nichiban Co., Ltd.: cellophane adhesive tape) was rapidly attached and detached. This procedure was repeated five times, and the degree of adhesion of coating was expressed in m/100 wherein m represents the number of squares remaining unremoved among the 100 squares.

Evaluation 3: Measurement of Total Light Transmittance and Haze

The laminate was measured for the total light transmittance and haze with a reflectometer/transmissometer HR-100 (Murakami Color Research Laboratory).

Evaluation 4: Test on Strength

A pencil was pressed against the laminate under a load of 9.8 N, and the strength of the laminate was evaluated in terms of the hardness of the pencil.

Evaluation 5: Scratch Resistance Test

A load of 4.9 N×2 was applied by a truck wheel CS-10F (manufactured by TABER INDUSTRIES) to the laminate by rotating the truck wheel by 100 turns. A difference in haze between before and after 100-turn rotation of the truck wheel was then determined.

TABLE 1

| | Example | Comparative Example 1 | Comparative Example 2 |
|---|---|---|---|
| Curling (mm) | 7 | Immeasurable | Immeasurable |
| Degree of adhesion of coating | 100/100 | 100/100 | 100/100 |
| Total light transmittance (%) | 92.0 | 91.9 | 92.0 |
| Haze (%) | 0.3 | 0.2 | 0.2 |
| Pencil hardness | H | H | B |
| Scratch resistance test | 7.6 | 6.8 | 6.0 |

What is claimed is:

1. A display device comprising an optical laminate comprising a transparent substrate and a hard coat layer provided on said transparent substrate, said hard coat layer being formed of a cured product of a composition comprising a mixture of pentaerythritol acrylate with an isocyanurate ethoxy-modified diacrylate represented by formula (I):

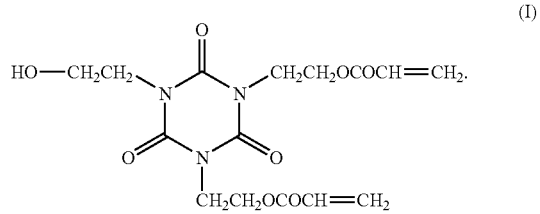

wherein said optical laminate has a reduced tendency for curling due to the hard coat layer.

2. The display device according to claim 1, wherein the difference in thickness between the center part and the peripheral part in the hard coat layer is not more than 1.0 μ.m.

3. The display device according to claim 1, wherein the mixing ratio between the pentaerythritol acrylate and the isocyanurate ethoxy-modified diacrylate is 4:6 to 6:4.

4. The display device according to claim 1, wherein said transparent substrate is triacetylcellulose.

5. The display device according to claim 1, wherein said hard coat layer further comprises an antistatic agent and/or an anti-dazzling agent.

6. The display device according to any one of claims 1 to 5, wherein said optical laminate further comprises at least one layer selected from the group consisting of an antistatic layer, an anti-dazzling layer, and a refractive index layer.

* * * * *

UNITED STATES PATENT AND TRADEMARK OFFICE
CERTIFICATE OF CORRECTION

| | | |
|---|---|---|
| PATENT NO. | : 7,247,358 B2 | Page 1 of 1 |
| APPLICATION NO. | : 10/946569 | |
| DATED | : July 24, 2007 | |
| INVENTOR(S) | : Hiroyuki Hashimoto et al. | |

It is certified that error appears in the above-identified patent and that said Letters Patent is hereby corrected as shown below:

Title Page, Item (73) Assignees should read
--Assignees: Dai Nippon Printing Co., Ltd., Tokyo (JP)
              The Inctec Inc., Kanagawa-ken (JP)--.

Signed and Sealed this

Twenty-ninth Day of December, 2009

David J. Kappos
*Director of the United States Patent and Trademark Office*